US012477160B1

(12) United States Patent
Gupta et al.

(10) Patent No.: US 12,477,160 B1
(45) Date of Patent: Nov. 18, 2025

(54) COMPUTER-IMPLEMENTED METHODS FOR DETERMINING SALIENT AND NON-SALIENT REGIONS IN VIDEO FRAMES

(71) Applicant: Amazon Technologies, Inc., Seattle, WA (US)

(72) Inventors: Prabhakar Gupta, Delhi (IN); Honey Gupta, Patna (IN); Abhinav Aggarwal, New Delhi (IN); Mayank Sharma, Bhopal (IN); Anil Kumar Kumar Nelakanti, Bangalore (IN); Kumar Keshav, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 17/850,711

(22) Filed: Jun. 27, 2022

(51) Int. Cl.
| | |
|---|---|
| *H04N 21/234* | (2011.01) |
| *G06V 10/46* | (2022.01) |
| *G06V 10/70* | (2022.01) |
| *G06V 20/40* | (2022.01) |
| *G06V 20/62* | (2022.01) |
| *G06V 40/10* | (2022.01) |
| *G06V 40/16* | (2022.01) |
| *H04N 21/81* | (2011.01) |

(52) U.S. Cl.
CPC ..... *H04N 21/23418* (2013.01); *G06V 10/462* (2022.01); *G06V 10/70* (2022.01); *G06V 20/41* (2022.01); *G06V 20/62* (2022.01); *G06V 40/103* (2022.01); *G06V 40/16* (2022.01); *H04N 21/8146* (2013.01)

(58) Field of Classification Search
CPC ............... G06V 10/462; H04N 21/812; H04N 21/23424
See application file for complete search history.

(56) References Cited

U.S. PATENT DOCUMENTS

| | | | |
|---|---|---|---|
| 8,218,895 B1 * | 7/2012 | Gleicher ................. | G06T 3/053 348/556 |
| 2002/0154833 A1 * | 10/2002 | Koch ........................ | G06T 7/12 382/325 |
| 2008/0101761 A1 * | 5/2008 | Widdowson ......... | H04N 1/3872 386/248 |

(Continued)

OTHER PUBLICATIONS

Chen et al., "Encoder-Decoder with Atrous Separable Convolution for Semantic Image Segmentation", Available Online at <https://arxiv.org/pdf/1802.02611.pdf>, Aug. 22, 2018, 18 pages.

(Continued)

*Primary Examiner* — Frank Johnson
(74) *Attorney, Agent, or Firm* — NICHOLSON DE VOS WEBSTER & ELLIOTT LLP

(57) ABSTRACT

Techniques for a computer-implemented service that utilizes a machine learning model to identify the salient and/or non-salient regions in a video frame are described. According to some embodiments, a computer-implemented method includes receiving a frame of a video at a content delivery service, generating, by a machine learning model of the content delivery service, a per pixel salience score map for the frame, and inserting, by the content delivery service, secondary content into the frame based at least in part on the per pixel salience score map for the frame.

**20 Claims, 11 Drawing Sheets
(2 of 11 Drawing Sheet(s) Filed in Color)**

(56) References Cited

U.S. PATENT DOCUMENTS

| | | | | |
|---|---|---|---|---|
| 2010/0199300 | A1* | 8/2010 | Meur | G11B 27/036 |
| | | | | 725/32 |
| 2013/0010062 | A1* | 1/2013 | Redmann | H04N 5/278 |
| | | | | 348/E13.064 |
| 2014/0359656 | A1* | 12/2014 | Banica | H04N 21/234 |
| | | | | 725/32 |
| 2015/0084978 | A1* | 3/2015 | Ballestad | G06T 5/92 |
| | | | | 345/589 |
| 2015/0154471 | A1* | 6/2015 | Ruan | G06V 10/28 |
| | | | | 382/190 |
| 2015/0169982 | A1* | 6/2015 | Perry | G06T 7/0002 |
| | | | | 382/195 |
| 2015/0206169 | A1* | 7/2015 | Ye | G06Q 30/0242 |
| | | | | 705/14.41 |
| 2016/0142747 | A1* | 5/2016 | He | H04N 5/2723 |
| | | | | 725/32 |
| 2016/0163058 | A1* | 6/2016 | Wei | G06V 10/25 |
| | | | | 382/171 |
| 2017/0032551 | A1* | 2/2017 | Fried | G06T 7/11 |
| 2017/0372162 | A1* | 12/2017 | Wang | G06T 7/11 |
| 2018/0300848 | A1* | 10/2018 | Kuzyakov | G06V 20/30 |
| 2019/0132520 | A1* | 5/2019 | Gupta | H04N 23/632 |
| 2020/0175700 | A1* | 6/2020 | Zhang | G06V 10/26 |
| 2020/0304754 | A1* | 9/2020 | Huynh Thien | G11B 27/031 |
| 2020/0372660 | A1* | 11/2020 | Li | G06V 10/764 |
| 2021/0065332 | A1* | 3/2021 | Bedi | G06T 3/4038 |
| 2022/0392210 | A1* | 12/2022 | Kim | G06N 3/045 |

OTHER PUBLICATIONS

OpenCV, "Miscellaneous Image Transformations", Open Source Computer Vision, Available Online at <https://docs.opencv.org/3.4/d7/d1b/group_imgproc_misc.html#ga8a0b7fdfcb7a13dde018988ba3a43042>, Retrieved on Apr. 27, 2022, pp. 1-17.

Zhao et al., "Pyramid Feature Attention Network for Saliency detection", 2019 IEEE/CVF Conference on Computer Vision and Pattern Recognition (CVPR), Available Online at <https://openaccess.thecvf.com/content_CVPR_2019/papers/Zhao_Pyramid_Feature_Attention_Network_for_Saliency_Detection_CVPR_2019_paper.pdf>, Jun. 2019, pp. 3085-3094.

* cited by examiner

COMPUTER-IMPLEMENTED METHODS FOR DETERMINING SALIENT AND NON-SALIENT REGIONS IN VIDEO FRAMES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

The patent or application file contains at least one drawing executed in color. Copies of this patent or patent application publication with color drawing(s) will be provided by the Office upon request and payment of the necessary fee.

Various embodiments in accordance with the present disclosure will be described with reference to the following drawings.

DETAILED DESCRIPTION

Figure 1:
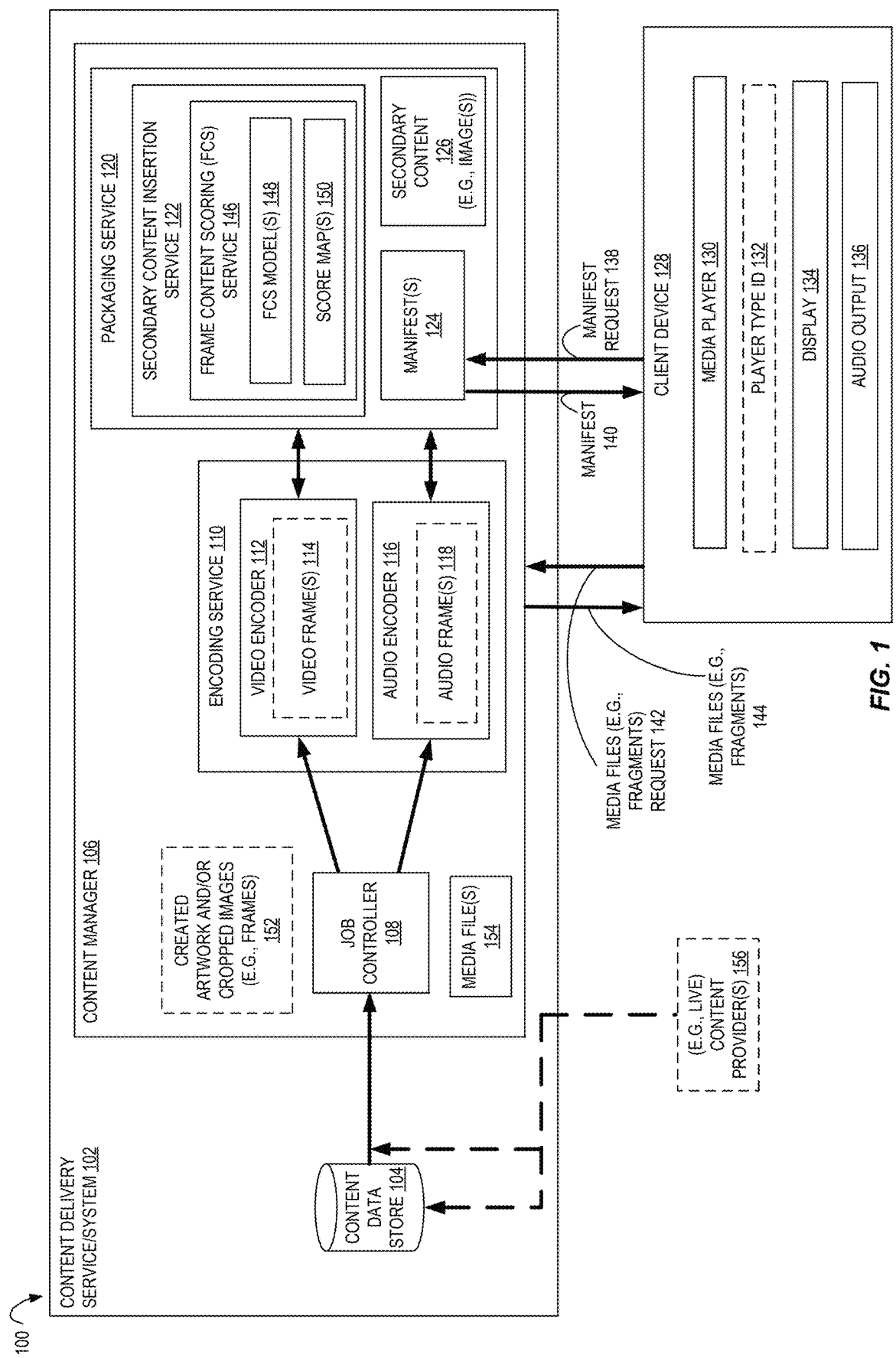
FIG. 1 is a diagram illustrating an environment including a content delivery service/system having a packaging service to implement a frame content scoring (FCS) service according to some embodiments.

The present disclosure relates to methods, apparatus, systems, and non-transitory computer-readable storage media for determining salient and/or non-salient regions in video frames. Certain embodiments herein are directed to a computer-implemented service that utilizes a machine learning model to identify the salient and/or non-salient regions in a video frame, for example, a video frame taken from digital entertainment content (DEC), such as, but not limited to, a movie or an (e.g., episodic) show (e.g., television show). In certain embodiments, a salient (e.g., most noticeable and/or important) region attracts more of a viewer's attention than a non-salient region. In certain embodiments, the determination of salient region(s) (e.g., visually salient region(s)) and/or non-salient region(s) (e.g., non-visually salient region(s)) is used to automate one or more media asset (e.g., artwork) creation tasks.

Media artwork is a powerful tool for engaging users and improving the discoverability of personalized content. However, certain artwork creation tasks, such as generating personalized promotional assets (e.g., cover-art), are manual, making it labor intensive, expensive, and unscalable. Embodiments herein are directed to a computer-implemented method that automates a diverse set of such media asset generation tasks by imitating the artistic perception of artwork creation. Embodiments herein use human-perception inspired saliency cues to score each pixel's appropriateness towards having perceptual importance. Certain embodiments herein train a machine learning model accordingly by formulating an objective function that combines the information from multiple saliency cues, such as, but not limited to, proximity to any actor's face, body regions, edge(s) of the frame, and/or distance from any textual information present in the frame. Certain embodiments herein are directed to a machine learning model that utilizes these crafted salience properties and generates a score map (e.g., heat-map) that perceptually scores the content at a pixel-level. In certain embodiments, the inference of a predicted score map that is output from the machine learning model enables multiple downstream tasks to identify one or more desired regions from the frame in an automated manner. In certain embodiments, the score maps provide hierarchical salience information (e.g., the score map enables the identification) for identifying one or more regions of interest for one or more asset creation tasks.

Embodiment herein are directed to computer-implemented (e.g., not human and not with pen-and-paper) detection of salient and/or non-salient regions in digital entertainment content video frames.

Embodiments herein are directed to a computer vision (CV) and machine learning (ML) based method that identifies the salient and/or non-salient regions in a video frame taken from digital entertainment content (DEC), e.g., a movie or a TV show. In certain embodiments, the detection of salient and/or non-salient regions is used to automate one or more (e.g., numerous) media asset creation tasks, such as, but not limited to, the generation of promotional media content (e.g., cover-art), placing non-obstructing (e.g., subtitle) text, and creation of marketing content, e.g., personalized images (e.g., posters).

Certain embodiments herein are directed to a computer-implemented method that detects a targeted area of interest (e.g., the non-informative/non-salient region) of the selected video frame. In certain embodiments, these regions are the secondary parts of the image where additional content and/or artifacts (e.g., the provider logo, the (e.g., movie/TV show) title logo, and/or subtitles) can be added. Detecting the salient and/or non-salient regions allows for the automation of media asset generation tasks, e.g., by identifying areas that do not overlap with the important or informative regions of the frame, such as the actor faces, focused objects (e.g., an automobile), etc. In certain embodiments, for promotional content, this includes placing additional artefacts (e.g., streaming partner logo, (e.g., opening and/or closing) credit information, etc.) in a region which makes them the visual highlight of the generated image while preserving the salient features of frame.

Performing such tasks manually by human artists who use their perception and skills to identify the best location for placing the artifacts makes the media creation process time consuming and costly to scale. Embodiments herein mimic the artistic perception by using a machine learning model to identify the salient and non-salient regions in a digital image or frame (e.g., in a video clip). These regions can then be used by multiple downstream tasks, e.g., to automate the media asset creation pipeline. Certain embodiments herein generate placement cues by identifying one or more (e.g., several) non-salient regions, e.g., which can then be filled with secondary content (e.g., relevant data and/or images). Certain embodiments herein generate automated assets for the titles, e.g., where these assets were previously unavailable.

In order to identify the amount of content information present at each point in the frame, certain embodiments herein predict a probability that scores the content present at each pixel of the frame. Certain embodiments herein take a frame as an image input and outputs a per pixel (e.g., of a two-dimensional block of pixels forming the image) salience score map (e.g., heat map) denoting the non-salient and/or salient information for the input image. To generate the heat-map containing the per-pixel information score, certain embodiments herein use numerous aspects of the image, such as (but not limited to) presence of faces, human bodies, burnt-in text, etc. In certain embodiments, the higher the score (for example, a score (of and) anywhere between a first value and a second value (e.g., zero to one, respectively), e.g., where the first value (e.g., zero) is the value indicative of a pixel being minimally salient and the second value (e.g., one) is the value indicative of a pixel being maximally salient) in the generated score map (e.g., heat-map), the more salient (e.g., less dead) of an item is present in that pixel (e.g., region). In certain embodiments, the secondary content (e.g., artifact, such as, but not limited to, a Prime Video logo) is to be as far as possible from the facial region(s) (e.g., faces of humans) but not located at a corner (e.g., the upper left or "dead" corner) of the frame. Hence, if there are actors present prominently in the frame, those actor's regions are to be scored higher and the background scored lower in certain embodiments. But if there are no actors present, for example, there is just one car in the entire frame, then that car becomes the salient aspect of the image and that region including the car is to be scored higher in certain embodiments. Thus, using these score maps (e.g., heat-map scores), certain embodiments herein allow for the picking of a region with a low score as a potential region to overlay the secondary content (e.g., additional artifact). Thus, embodiments herein are directed to a computer-implemented method that avoids the salient regions while adding the artifacts but simultaneously gives importance to the additional artifacts by placing them at a co-salient region (e.g., not in a corner of the frame). Embodiments herein are directed to a machine learning model that attempts to replicate the human perception towards the frame's content by considering other items (e.g., important or informative regions of the frame) present in the frame. Certain embodiments herein are directed to a machine learning model that generates an output based at least in part on co-salient cues (e.g., such as centeredness of the pixel in the frame relative to one or more edges) to encourage a higher score for more eye-catching regions of the frame (e.g., not merely locating secondary content on and/or adjacent to the edge(s) of a frame).

Digital entertainment industry is growing multi-fold with ease of internet access and numerous options for on-demand streaming platforms. By utilizing a recommendation system, streaming platforms can employ multiple personalized media artworks to enhance the viewing experience, be it promotional assets like cover-art or marketing assets like posters. In certain embodiments, these customized assets are manually designed by an artist which involves using their artistic knowledge. For example, to create a cover-art, an artist typically identifies a co-salient region to place the title logo onto a chosen frame. Similarly, there are several other asset creation tasks that require human visual perception in identifying the appropriate image region. Since this action requires human perception of the image content, it is exceedingly difficult to train a model to create these assets in an automated manner.

Embodiments herein automate these media creation tasks by replicating the artistic vision of identifying the appropriate secondary salient regions in a frame. In certain embodiments, an artist's approach for placing an artifact would be to avoid the salient regions such as the actors' faces and place the artifact onto a co-salient region to accentuate its visibility. Embodiments herein imitate this perceptual quality by using a set of carefully crafted saliency cues and generating score maps (e.g., heat maps) based on each of the individual cues. In certain embodiments, these scores indicate the content's perceptual importance at a pixel-level, e.g., when the particular saliency cue is considered. In certain embodiments, a combination of these perceptual score maps is used to train a model that predicts an overall score (e.g., score map) for an input frame. To replicate the human perception of choosing a region based on the image content, certain embodiments herein use cues like proximity from actor's face or actor bodies or any textual information present in the frame. Certain embodiments herein also consider secondary cues such as centeredness of the pixel to encourage a higher score for more eye-catching regions.

Scoring image content based on perceptual cues enables automation of asset creation tasks as it allows for the identification of multiple non-salient and/or salient regions based on the task at hand, e.g., and uses those identified regions to perform additional processing. Embodiments herein are extended to support various downstream services (e.g., functions) such as, but not limited to, media asset creation tasks. In certain embodiments, these include:

1. Automated Cover-Art Generation: Certain embodiments herein use a machine learning model trained to generate a per pixel salience score map for a frame (e.g., after identifying a relevant frame from the video)

and the dimensions (e.g., size) of a predefined image (e.g., title logo) to mark the area where the image can be suitably placed (e.g., overlaid) without visually disturbing the entire content of the frame but giving the best location for the image to be placed. In certain embodiments, the cover-art is a custom designed artwork/poster for a title (e.g., movie or TV show) that contains a frame and the title logo(s) placed onto the frame. In certain embodiments, the frame(s) are chosen based on the personalized attributes of a particular user (e.g., particular viewer), such as showing their favorite actor and/or depicting an action sequence if a user is interested in action titles.

2. Best Crop Detection: Certain embodiments herein use the per pixel salience score map (e.g., heat map) for a frame to identify one or more region(s) of the image that is most important and find the best (e.g., fixed-size) crop, e.g., where the resulting cropped frame has one or both dimensions that are smaller than the corresponding dimensions of the uncropped frame. Example uses are for generating actor profile shots and/or fitting a large image in a small template for cover-art.

3. Logo Placement: Certain embodiments herein use the per pixel salience score map (e.g., heat map) for a frame to identify the best location for placing a (e.g., fixed-size) logo, for example, an Amazon® Prime Video logo. In certain embodiments, the best location is not a fixed location, e.g., always in the top-right or bottom-right corner. In certain embodiments, the best location is determined for each title (e.g., on a frame by frame basis) to avoid occluding any visually important information.

4. Subtitle Placement: Certain embodiments herein use the per pixel salience score map (e.g., heat map) for a frame to identify the best location for placing subtitles (e.g., corresponding textual version of the audio of the multimedia file), e.g., instead of a fixed location. In certain embodiments, instead of only placing subtitles in the bottom one-third of the image with center and middle alignment, the best location is determined so as to not occlude any important information, e.g., so as to not occlude any text that is already present in the video (e.g., frame).

Embodiments herein improve the functioning of a computer-implemented service by utilizing a machine learning model to identify the salient and/or non-salient regions in a video frame, e.g., instead of requiring a human to do so. Embodiments herein improve the functioning of a computer-implemented service by utilizing a plurality of pixel-wise score maps (see, e.g., FIG. 4) to train a machine learning model to identify the salient and/or non-salient regions in a video frame. Embodiments herein improve the functioning of a computer-implemented service by utilizing a trained machine learning model to identify the salient and/or non-salient regions in a video frame, e.g., via the machine learning model outputting a (e.g., single) pixel-wise score map that is used to identify the salient and/or non-salient regions in the video frame.

FIG. 1 is a diagram illustrating an environment 100 including a content delivery service/system 102 having a packaging service 120 to implement a frame content scoring (FCS) service 146 according to some embodiments.

The depicted content delivery service/system 102 includes a content data store 104, which may be implemented in one or more data centers. As one example, a media file (e.g., including a video file and audio file) (e.g., a media container) that is to be encoded is accessed from the content data store 104 by content manager 106. The media file may be uploaded to content data store 104 by content provider(s) 156 or provided directly (e.g., as live content) to content manager 106 by content provider(s) 156 (e.g., from a live content encoder).

In certain embodiments, the content manager 106 includes a job controller 108 to control each encoding job. In certain embodiments, job controller 108 controls the encoding (e.g., transcoding) of a media file into packages and files in various formats and in different sizes for distribution to end users (e.g., viewers). In certain embodiments, a user (e.g., separate from an end user or client) creates a job for a (e.g., uncompressed) multimedia file from content data store 104 by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply, etc. In certain embodiments, to set up a job in job controller 108, a user specifies the input files (e.g., from content data store 104) for the service to encode (e.g., transcode from one format to a different format), for example, by specifying the source for each video, audio, and/or captions media element. That source might be a specific part of a primary input file, or it might be a separate file. In certain embodiments, to set up a job in job controller 108, a user specifies the types of output files (e.g., and packages) that are to be generated from the input. In certain embodiments, to set up a job in job controller 108, a user specifies the encoding settings to produce the quality and type of output that is desired.

In certain embodiments, the encoding service 110 is to encode the media file (e.g., video file and corresponding audio file) into a plurality of video and audio representations (e.g., streams). In FIG. 1, video encoder 112 is to receive an input of a video file and create video frame(s) 114 from that video file, e.g., for a video frame and/or fragment duration. In FIG. 1, audio encoder 116 is to receive an input of an audio file and create audio frame(s) 118 (e.g., a number of audio samples within each frame) for that audio file, e.g., at an audio frame and/or fragment duration. In certain embodiments, packaging service 120 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 110 may include a plurality of instances of video encoder 112 and audio encoder 116, e.g., to process multiple inputs in parallel. In certain embodiments, In certain embodiments, packaging service 120 includes one or more manifests 124, e.g., identifying the media file(s) 154 (e.g., fragments, streams, etc.). In certain embodiments, a manifest for a particular media file (e.g., a particular title) identifies a proper subset of video and audio representations of the media file for a particular client device 128 (e.g., based on the client's media player 130 (e.g., determined from its type ID value 132), display 134 resolution, audio output 136 capabilities, and/or available bandwidth). In certain embodiments, the content is stored in the content delivery service/system 102 in two parts: (i) the manifest 124 of all available media representations (e.g., their URL addresses and, optionally, other characteristics) and (ii) the media files 154 (e.g., representations) (e.g., stream of fragments) in a single (e.g., container) or multiple files. In certain embodiments, a client device 128 is to read (or store)

a manifest 140 (e.g., sent in response to manifest request 138) before the client device may make a request 142 for the media from that manifest, and thus access media files 144 (e.g., audio fragments and corresponding video fragments) from media file 154 storage.

In certain embodiments, secondary content insertion service 122 adds secondary content (e.g., advertisement(s)) into a main content. In certain embodiments, encoding service 110 is to encode both the main content and secondary content, e.g., and the secondary content insertion service 122 is to insert the secondary content into the main content.

In certain embodiments, the secondary content insertion service 122 includes a frame content scoring (FCS) service 146, e.g., to generate one or more score maps 150 as discussed herein. In certain embodiments, the FCS service 146 utilizes one of more FCS machine learning models 148, e.g., to generate one or more score maps 150.

In certain embodiments, the FCS service 146 is separate from the packaging service 120, e.g., in embodiments where the FCS service 146 (e.g., as part of content manager 106 services/system) is used to generate cover art, e.g., used for best crop detection. In certain embodiments, the FCS service 146 outputs a score map 150 and the content manager 106 generates artwork and/or cropped images 152 based at least in part on the score map 150. In certain embodiments, the FCS service 146 outputs a score map 150 and the content manager 106 (e.g., secondary content insertion service 122 thereof) inserts secondary content 126 (e.g., logos, subtitles, etc.) based at least in part on the score map 150. In certain embodiments, a video (e.g., frame) with its secondary content 126 inserted into the video is then encoded, e.g., and the resulting output is a media file 144, e.g., with the frame with secondary content displayed on display 134.

In one embodiment, a direct approach could be to use a saliency detection method and consider the outputs as content scores. However, certain saliency detection methods majorly focus on salient object(s) detection rather than overall content scoring. Certain embodiments herein of a machine learning model 148 detects the salient and/or non-salient regions in a hierarchical way, e.g., making it possible to place additional content (e.g., a logo) at a secondary salient region (e.g., enhancing the logo's visibility). Certain embodiments herein are computer-implements methods that replicate the human process of content creation and hence are tailored to the target problem space.

Figure 3:
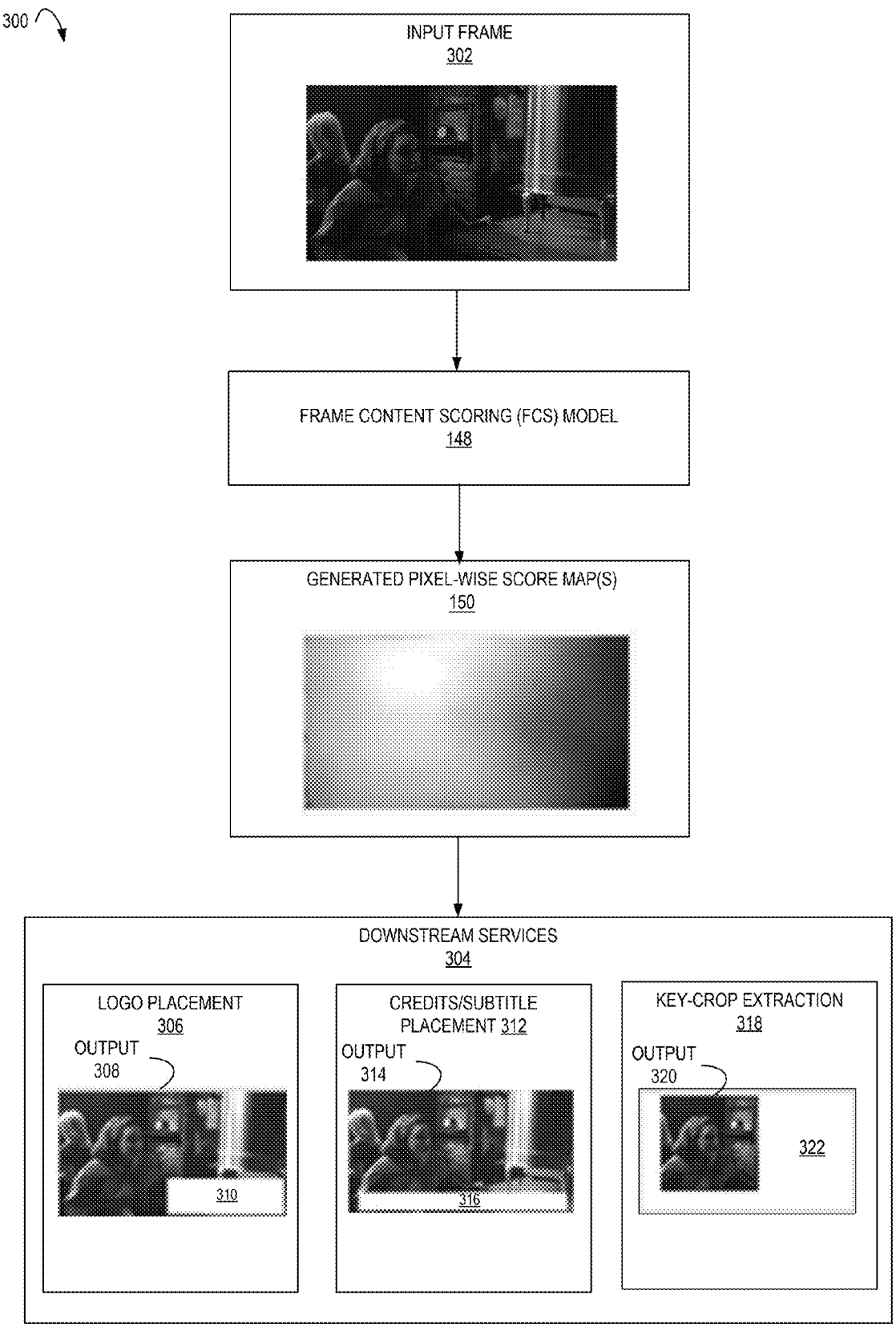
FIG. 3 is a flow diagram illustrating operations of a method utilizing a frame content scoring (FCS) model that generates a pixel-wise score map for an input of a frame according to some embodiments.

In certain embodiments herein, machine learning model (e.g., FCS model 148) automates one or more media asset creation tasks by generating a pixel-wise score map for a given frame, e.g., where this score map quantifies the saliency information of the content using multiple human-perception inspired visual cues (e.g., without relying on a human). Certain embodiments herein detect frame regions appropriate for the target application based on the saliency scores, e.g., as shown in FIG. 3. In certain embodiments, the FCS model (Φ) 148 takes a frame x and predicts (e.g., generates an inference of) a score map (z) 150, e.g., denoting the salient information at each pixel. In certain embodiments, to train the model (e.g., without ground-truth labels for content saliency scores), a set of saliency cues are used to derive score maps for each of the cues (e.g., score maps 150A-150E and/or combined score map 150F in FIG. 4). In certain embodiments, these score maps (e.g., score maps 150A-150E and/or combined score map 150F in FIG. 4) are used in our formulated loss function to train the FCS model 148 for the desired perceptual qualities and generate an overall saliency score map for the frame (e.g., output score map 150 in FIG. 3 and/or resulting score maps 150 in FIG. 5).

Figure 2:
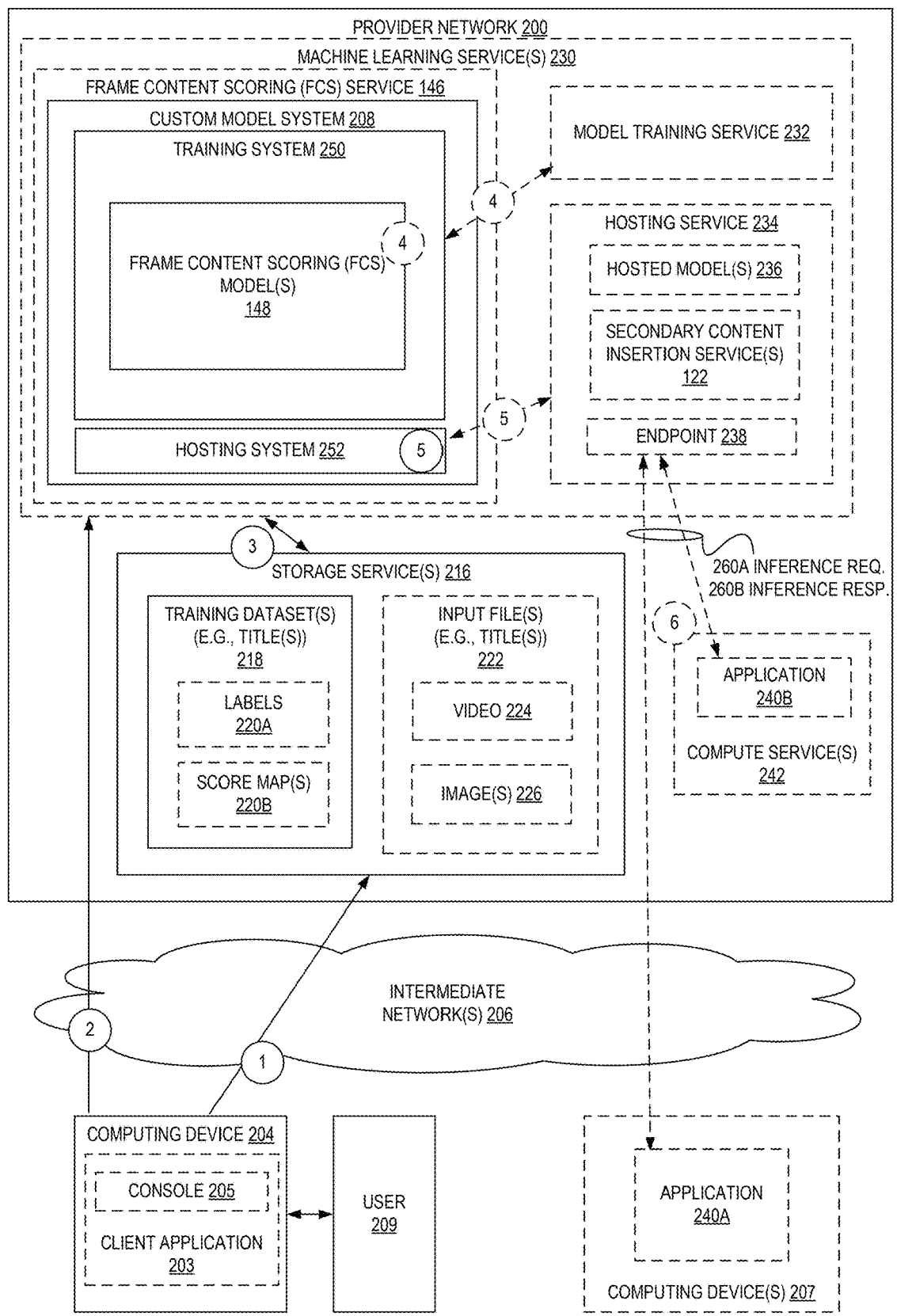
FIG. 2 is a diagram illustrating an environment for creating, training, and using one or more machine learning models according to some embodiments.

FIG. 2 is a diagram illustrating an environment for creating, training, and using one or more machine learning models 148 according to some embodiments. FIG. 2 includes a frame content scoring (FCS) service 146, one or more storage services 216, one or more machine learning services 230, and one or more compute services 242 implemented within a multi-tenant provider network 200. Each of the frame content scoring (FCS) service 146, one or more storage services 216, one or more machine learning services 230, one or more model training services 232, one or more hosting services 234, and one or more compute services 242 may be implemented via software, hardware, or a combination of both, and may be implemented in a distributed manner using multiple different computing devices.

A provider network 200 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 242), a storage service 216 that can store data objects, etc. The users (or "customers") of provider networks 200 may utilize one or more user accounts that are associated with a customer account, though these terms may be used somewhat interchangeably depending upon the context of use. Users may interact with a provider network 200 across one or more intermediate networks 206 (e.g., the internet) via one or more interface(s), such as through use of application programming interface (API) calls, via a console 205 implemented as a website or application, etc. The interface(s) may be part of, or serve as a front-end to, a control plane of the provider network 200 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 200 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 200 by an on-demand code execution service (which may be one of compute service(s) 242) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 240B) that can be executed on demand, without requiring the user to maintain dedicated infrastructure to execute the serverless function. Instead, the serverless functions can be executed on demand using resources maintained by the provider network 200. In some embodiments, these resources may be maintained in a "ready" state (e.g., having a pre-initialized runtime environment configured to execute the serverless functions), allowing the serverless functions to be executed in near real-time.

The frame content scoring (FCS) service 146, in some embodiments, is a machine learning powered service that makes it easy for users to determining salient and/or non-salient regions in video frames, for example, from an output of the model of a per pixel salience score map (e.g., via the probability that each pixel includes a salient region).

The training system 250, for example, may enable users to generate one or more machine learning models (e.g., FCS machine learning model(s) 148) that output results (e.g., a score map) for an input (for example, of a video 224 and/or images, e.g., from input file(s) 222. In certain embodiments, the training system 250 enables users to generate an FCS model 148 that outputs a value or other indication for each pixel, such that they cumulatively (e.g., logically) form a two-dimensional per pixel salience score map from an input of a file 222 (e.g., a frame of video 224).

Embodiments herein allow a customer to create one or more machine learning models 148 by supplying a training dataset 218 (for example, including labels 220A, e.g., labels that indicate if a training image/frame includes a salient region(s) and/or score map(s) 220B used for training).

In some embodiments, the frame content scoring (FCS) service 146—via use of a custom model system 208—allows users to build and use model(s) 148.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a candidate algorithm into model(s), e.g., into FCS machine learning model 148, and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 209 may provide or otherwise identify data 218 (e.g., with labels 220A and/or score maps 220B) for use in creating a custom model. For example, as shown at circle (1), the user 209 may utilize a client application 203 executed by a computing device 204 (e.g., a web-application implementing a console 205 for the provider network 200, a standalone application, another web-application of another entity that utilizes the classification service 146 as a part of its backend, a database or mixed-SQL environment, etc.) to cause the computing device 204 to upload the data 218 to a storage location (e.g., provided by a storage service 216 such as an object storage service of a provider network 200).

The data 218 may be a columnar dataset that includes rows (or entries) of data values, where the data values may be arranged according to one or more columns (or attributes) and may be of a same datatype (e.g., one storing text). In some cases, the data 218 includes headings or other metadata describing names or datatypes of the columns, though in some cases this metadata may not exist. For example, some or all of the data 218 may have been provided by a user as a plaintext file (e.g., a comma-separated values (CSV) or tab-separated values (TSV) file), an exported database table or structure, an application-specific file such as a spreadsheet, etc.

For example, when a user 209 desires to train a model 148, this file (or files) may include labels corresponding to the file (e.g., video, audio, and/or text), e.g., with a label indicating category (ies) of content in the file.

Thereafter, at circle (2) the computing device 204 may issue one or more requests (e.g., API calls) to the machine learning service 230 that indicate the user's 209 desire to train one or more algorithms into model(s), e.g., into an FCS machine learning model 148. The request may be of a type that identifies which type of model(s) are to be created or identifies that the machine learning service 230 itself is to identify the candidate model(s), e.g., candidate FCS machine learning model 148. The request may also include one or more of an identifier of a storage location or locations storing the data 218 (e.g., an identifier of the labels 220A and/or score maps 220B), which may identify a storage location (e.g., via a Uniform Resource Locator (URL), a bucket/folder identifier, etc.) within the provider network 200 (e.g., as offered by a storage service 216) or external to the provider network 200, a format identifier of the data 218, a language identifier of the language of the labels 220A, etc. In some embodiments, the request includes an identifier (e.g., from the user 209) of the candidate algorithm(s) themselves within the request.

Responsive to receipt of the request, the custom model system 208 of the machine learning service 230 is invoked and begins operations for training the corresponding type of model. For example, the custom model system 208 may identify what type of model is to be trained (e.g., via analyzing the method call associated with the request), the storage location(s) associated with the data 218 (e.g., labels 220A and/or score maps 220B), etc. Thus, the custom model system 208 may retrieve any stored data 218 elements as shown at circle (3), which may be from a storage location within the provider network 200 or external to the provider network 200.

In some embodiments, the training (at dotted circle (4), (5), and/or (6) in model(s) 148) of model(s) 148, e.g., video machine learning model 148A, audio machine learning model 148-B, and/or text machine learning model 148C, includes performing (at optional, dotted circles (4), (5), and/or (6)) by training service 232 of machine learning service 230 a particular training job (e.g., hyperparameter optimization tuning job), or the like.

In some embodiments, the hosting system 252 (at circle (5)) of the custom model system 208 may make use (at optional, dotted circle (5)) of a hosting service 234 of a machine learning service 230 to deploy a model as a hosted model 236 in association with an endpoint 238 that can receive inference requests from client applications 240A and/or 240B at circle (8), provide the inference requests 260A to the associated hosted model(s) 236, and provide inference results 260B (e.g., a prediction, including, but not limited to, a per pixel salience score map) back to applications 240A and/or 240B, which may be executed by one or more computing devices 207 outside of the provider network 200 or by one or more computing devices of a compute service 242 (e.g., hardware virtualization service, serverless code execution service, etc.) within the provider network 200. Inference results 260B may be displayed to a user and/or viewer (e.g., in a graphical user interface of the application) and/or exported as a data structure (e.g., in a selected format). In certain embodiments, the inference results are utilized by secondary content insertion service(s) 122 to insert secondary content into the input file 222 based at least in part on the inference results of a per pixel salience score map.

FIG. 3 is a flow diagram illustrating operations 300 of a method utilizing a frame content scoring (FCS) model that generates a pixel-wise score map for an input of a frame according to some embodiments. Some or all of the operations 300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 300 are performed by content delivery system 102 (e.g., implemented in a provider network) of the other figures.

The operations 300 include receiving an input frame 302. The operations 300 further include inputting the frame (or a set of values based on the frame) into the frame content scoring (FCS) model 148, which in response, generates an inference of a pixel-wise score map 150 (e.g., shown with the most salient portions indicated in white and the lesser salient portions indicated by a corresponding level of blackness). As seen by the mapping of the input frame 302 to the pixel-wise score map 150, the actor facing the camera on the left side of the frame 302 is indicated in the score map 150 as the brightest (e.g., the brightest portion of the map corresponding to the actor's face). The operations 300 further include one or more downstream services 304 accessing (e.g., receiving) the score map 150, e.g., for example, with (i) logo placement 306 service outputting an indication that region 310 (shown as whited out, but not so required) is the best location for a logo of those dimensions of region 310 (e.g., that is not a static decision) in frame 302 (e.g., with service 306 outputting a frame 308 with the logo inserted in it), (ii) credit/subtitle placement 312 service outputting an indication that region 316 (shown as whited out, but not so required) is the best location for credits or a subtitle of those dimensions of region 316 (e.g., that is not a static decision) in frame 302 (e.g., with service 312 outputting a frame 314 with the credits and/or subtitle inserted in it), and/or (iii) key-crop extraction 318 service outputting an indication that region 320 (e.g., and not region 322, shown as whited out, but not so required) is the best location to keep (e.g., crop), for example, for an image of the actor in frame 302.

In certain embodiments, one or more score maps are generated, and then used to train an FCS machine learning model into generating a salience score map.

Figure 4:
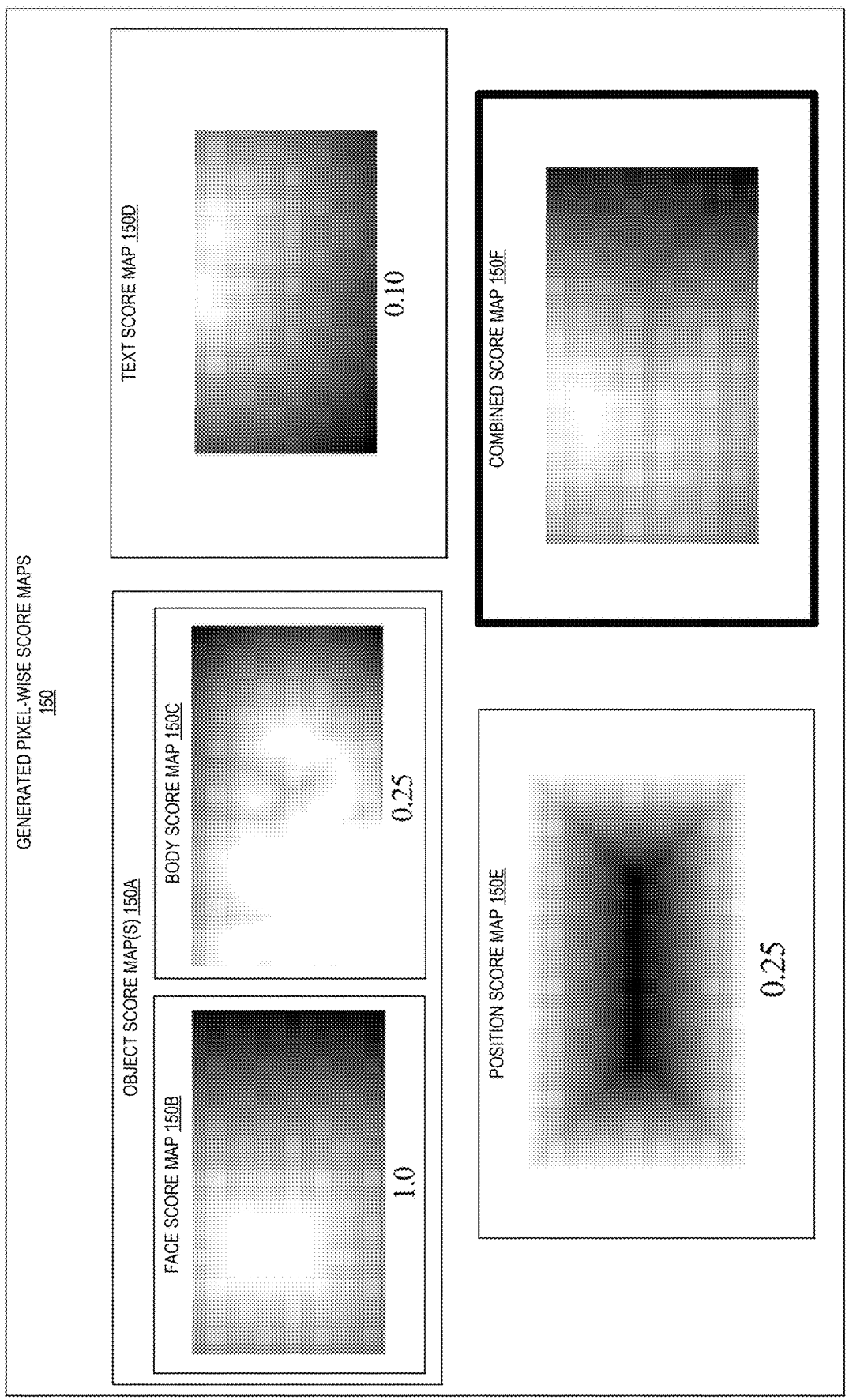
FIG. 4 illustrates example pixel-wise score maps according to some embodiments.

FIG. 4 illustrates example pixel-wise score maps 150 according to some embodiments, e.g., for an input of frame 302 from FIG. 3.

For a task of cover-art creation, in certain embodiments, a typical location for logo placement chosen by an artist would be a region that is away from an object (e.g., an actor's face or body), but somewhere in the visible location while avoiding any other important object such as texts. Certain embodiments translate this behavior into visual cues and convert these cues into pixel-wise content scores, as shown in FIG. 4.

Proximity from face regions. Certain embodiments herein use the distance from facial pixels as a measure for the content score, e.g., the further a pixel is from a facial region, the lower its saliency score. For an input frame x, certain embodiments first use a face detection model to identify all the faces. Certain embodiments filter out predictions that have a confidence less than a threshold (e.g., 0.9) and pixel-area less than a threshold (e.g., 30%) of the image area. In certain embodiments, this results in a binary-mask $x_{face}$ containing the prominent facial regions of the frame. Certain embodiments convert this face-mask into a face score map 150B, e.g., via using an L2 distance transform D. Hence, the generated face-score $z_{face}$=D ($x_{face}$).

Proximity from body regions. Certain embodiments herein use the distance from body (e.g., excluding the face) pixels as a measure for the content score, e.g., the further a pixel is from a human body region detected in the frame, the lower its salience score. Certain embodiments use a semantic segmentation model to identify various objects in the image. Certain embodiments next find regions corresponding to one or more human bodies and generate a binary body-mask $x_{body}$. Certain embodiments convert this body-mask into a body score map 150C, e.g., via using an L2 distance transform D. Hence, the generated face-score $z_{body}$=D ($x_{body}$).

Proximity from textual regions. A frame can have burnt-in text or a textual region in the scene that might become a secondary salient region. Certain embodiments herein use the distance from text or textual region pixels as a measure for the content score, the further a pixel is from a text or textual region detected in the frame, the lower its salience score. Certain embodiments use a character-level text detection model identify regions where there is any text in the frame. Certain embodiments generate a binary text-mask $x_{text}$ and derive the text score map 150D, e.g., via using distance transform, $z_{text}$=D ($x_{text}$).

Pixel-location or centeredness. Certain embodiments herein use the pixel location (e.g., centeredness) within a frame as a determining factor influencing the content saliency. In certain embodiments, the more central the pixel location, the more likely it is to be visible in the absence of a prominent salient object. Certain embodiments translate this into position score map 150E ($z_{pos}$) (e.g., where the edges are the most salient regions), e.g., via using the L2 distance of pixels from the center location.

Note that the weights below the score maps 150B-150E are examples, and it should be understood that different weights may be utilized. For example, since the contribution of each cue towards overall saliency may be desired to be different, certain embodiments herein combine the score maps with weights based on their perceptual relevance (e.g., perceptual weights) into a single combined score map 150F. For example, where combined score map 150F (z)=$\gamma_{face}*z_{face}+\gamma_{body}*z_{body}+\gamma_{text}*z_{text}+\gamma_{pos}*z_{pos}$, e.g., where example values of $\gamma_{face}, \gamma_{body}, \gamma_{text},$ and $\gamma_{pos}$ are 1.0, 0.25, 0.1, and 0.25, respectively, although other values may be selected and/or used. Certain embodiments of the FCS model learn to generate the overall saliency score (e.g., corresponding to combined score map 150F) by considering these multiple weighted scores in its loss function. In certain embodiments, the final loss function is a cross-entropy loss $\mathcal{L}$ s between z and z'. Hence, $\mathcal{L}_{FCS_{FCS}}(x, z)=\mathcal{L}_{s_s}(\Phi(x), z)$ in certain embodiments.

Certain embodiments use a convolutional neural network (CNN) model as the architecture for the FCS model. Certain embodiments train the CNN network to predict the score map z, with a range of 0 to 1, using the weighted score maps. For example, where the higher the score, the higher the saliency content of the pixel.

In certain embodiments, the output (e.g., the pixel-wise score map) from FCS model is used for one or more (e.g., automated) downstream services.

Figure 5:
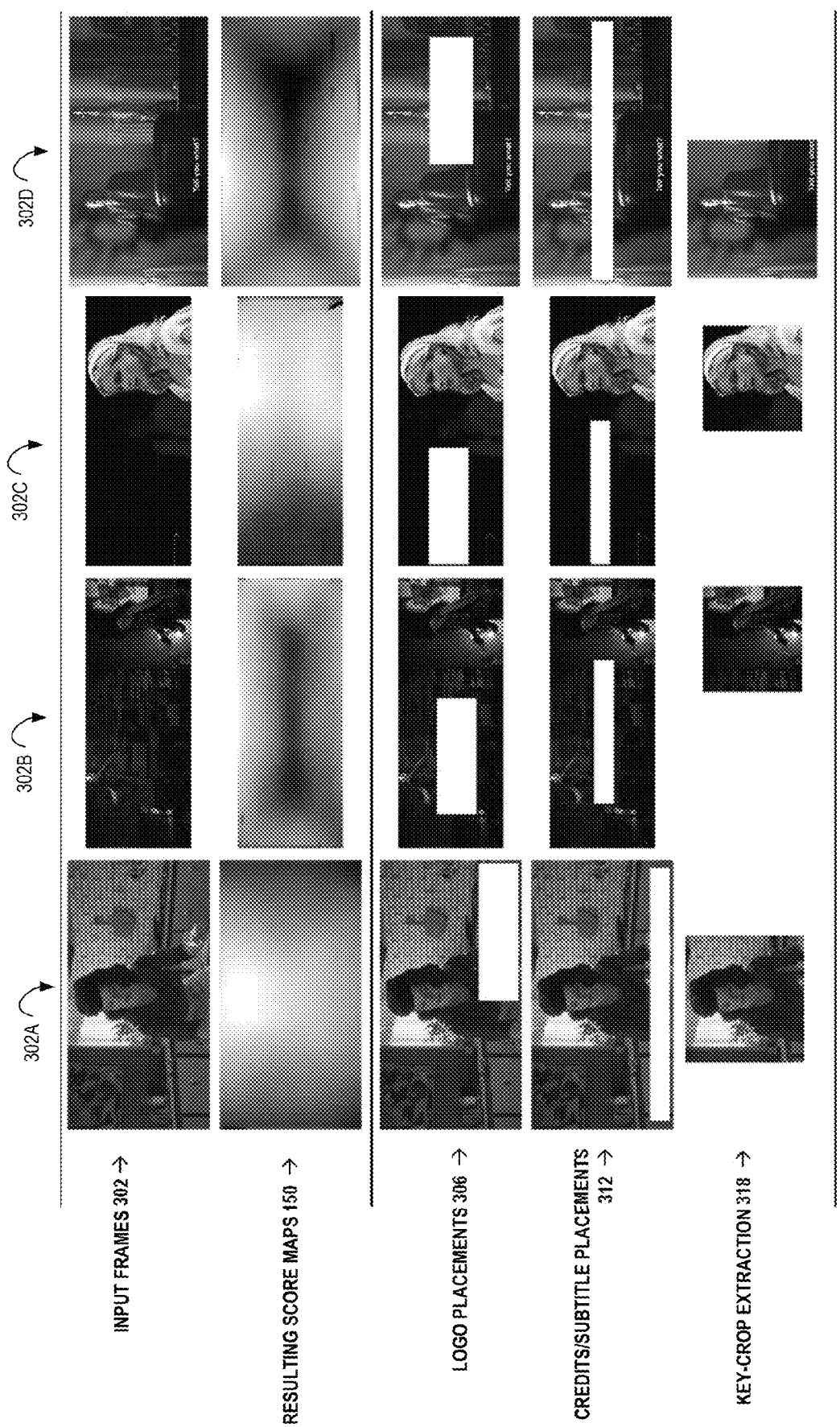
FIG. 5 illustrates example outputs for different downstream services for an input of a pixel-wise score map generated for corresponding input frames according to some embodiments.

FIG. 5 illustrates example outputs for different downstream services for an input of a pixel-wise score map generated for corresponding input frames 302A-302D according to some embodiments. FIG. 5 illustrates, (i) for input frame 302A, the resulting output of a pixel-wise score map (shown below the corresponding input frame 302A) from a trained FCS model, (ii) for input frame 302B, the resulting output of a pixel-wise score map (shown below the corresponding input frame 302B) from a trained FCS model, (iii) for input frame 302C, the resulting output of a pixel-wise score map (shown below the corresponding input frame 302C) from a trained FCS model, and (iv) for input frame 302D (e.g., with existing text in the frame), the resulting output of a pixel-wise score map (shown below the corresponding input frame 302D) from a trained FCS model of resulting score maps 150.

FIG. 5 further illustrates, below each corresponding input frame, generating logo placement placements 306, credits/subtitle placements 312, and key-crop extraction 318.

Cover-art generation. In certain embodiments, for automated cover-art creation, the target placement is to add a logo at a prominent region without occluding any salient object. Where the FCS model gives the saliency score for the entire frame, certain embodiments herein determine the appropriate location for logo placement (e.g., by secondary content insertion service 122) by performing a grid search over the predicted score map, e.g., by fixing the search region to the dimensions (e.g., size) of the logo and computing the cumulative saliency score by summing up the pixel-wise scores falling inside the region under consideration. Certain embodiments take an argument of the minimum (argmin), e.g., the set of values where the function attains the minimum) over the computed region-wise scores to find the optimal location for the logo. The white regions in row three of FIG. 5 show the predicted locations for logo placement for frames from four different movies/TV shows.

Credits/Subtitle placement. In certain embodiments, for adding the credits information (e.g., the production name), the target placement for the credits/subtitles is a (e.g., a thin and long) region in the frame that does not occlude any salient object. For subtitles, it may be desirable to place them in the bottom one-third of the image. However, if there is salient region (e.g., burnt-in text already in the frame), it is desirable to avoid that salient region in certain embodiments. Since certain embodiments of the FCS model considers textual content as well while generating the saliency scores, the score map is (e.g., directly) used to find a suitable location. Certain embodiments perform a grid search with dimensions of (e.g., similar to) that of the text blocks and pick the (e.g., optimal) region with a minimum cumulative saliency score. The white regions in row four of FIG. 5 show the predicted locations for credit/subtitle placement for frames from four different movies/TV shows, e.g., which are different than (i) the locations of the credits/subtitle placements 312 for the other frames and (ii) the locations of the logo placements 306 and key-crop extractions 318 for that frame.

Key crop extraction. In certain embodiments, media artwork (e.g., the banner images in the carousel of a streaming website) have a fixed dimensional template. In certain embodiments, these templates have a pre-defined location for placing the frame's salient region, the title logo, and/or other texts (e.g., "Coming soon"). Embodiments herein automate the creation of such artwork by determining the key salient region of the frame, e.g., given the size of the region to be extracted. Certain embodiments perform a grid search with dimensions of (e.g., similar to) that of the template and pick the (e.g., optimal) region with a maximum (e.g., highest) cumulative saliency score. The cropped images in row five of FIG. 5 show the key (e.g., most salient) cropped portions from frames from four different movies/TV shows, e.g., which are different than (i) the locations of the key-crop extractions 318 for the other frames and (ii) the locations of the logo placements 306 and credits/subtitle placements 312 for that frame.

Embodiments herein are thus effective in capturing the relative salience information and replicating a human's perception of image content. Embodiments herein generate a score map that rates the entire frame's saliency, e.g., in contrast to the saliency model which predicts a (e.g., substantially) binary saliency map. Embodiments herein are directed to a method that automates a diverse set of media asset creation tasks by imitating the artistic perception of artwork creation. In certain embodiments, an FCS model uses human-inspired visual cues to generate a score map that quantifies the saliency of each pixel, e.g., without requiring a human perform that task.

Figure 6:
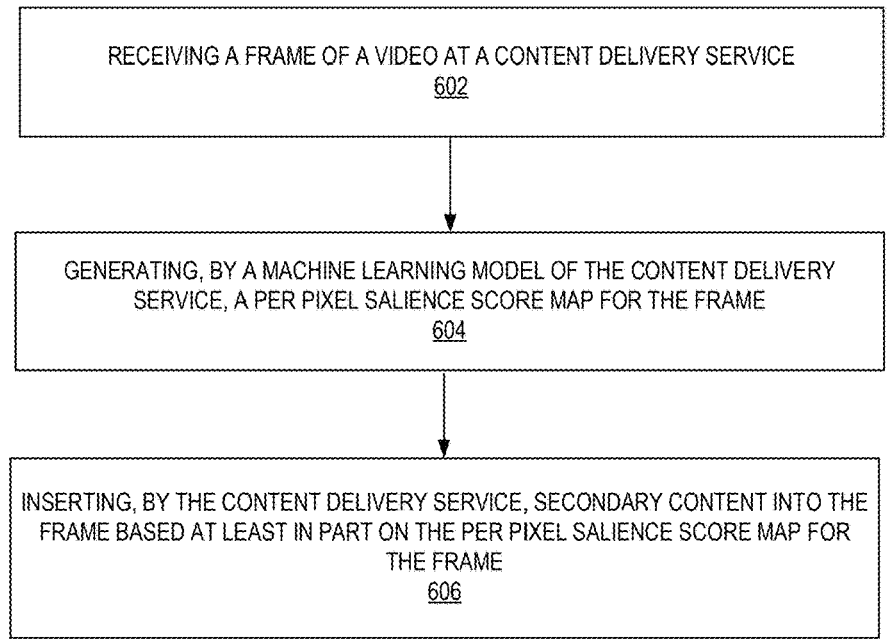
FIG. 6 is a flow diagram illustrating operations of a method of inserting secondary content into a frame based at least in part on a per pixel salience score map generated by a machine learning model (e.g., an FCS model) for the frame according to some embodiments.

FIG. 6 is a flow diagram illustrating operations 600 of a method of displaying a slate and then a video according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by a device (e.g., device 1000) and/or content delivery system 102 (e.g., implemented in a provider network) of the other figures.

The operations 600 include, at block 602, receiving a frame of a video at a content delivery service. The operations 600 further include, at block 604, generating, by a machine learning model of the content delivery service, a per pixel salience score map for the frame. The operations 600 further include, at block 606, inserting, by the content delivery service, secondary content into the frame based at least in part on the per pixel salience score map for the frame.

Exemplary environments, systems, etc. that the above may be used in are detailed below.

At least some embodiments of the disclosed technologies can be described in view of the following examples:

Example 1. A computer-implemented method comprising:
  receiving a first frame of a first video at a content delivery service;
  generating, by the content delivery service, a first per pixel salience score map for one or more objects in the first frame;
  generating, by the content delivery service, a second per pixel salience score map for one or more edges of the first frame;
  combining, by the content delivery service, the first per pixel salience score map for the one or more objects in the first frame and the second per pixel salience score map for the one or more edges of the first frame into a single per pixel salience score map for the first frame;
  training a machine learning model based at least in part on the single per pixel salience score map for the first frame;
  receiving a second frame of a second video at the content delivery service;
  generating, by the machine learning model, a per pixel salience score map for the second frame; and
  inserting, by the content delivery service, secondary content into (e.g., visually on top of content of) the second frame based at least in part on the per pixel salience score map for the second frame.

Example 2. The computer-implemented method of example 1, wherein the generating, by the content delivery service, the first per pixel salience score map for the one or more objects in the first frame comprises at least one of:
  generating, by the content delivery service, a face score map for one or more human faces in the first frame; or
  generating, by the content delivery service, a body score map for one or more human bodies in the first frame.

Example 3. The computer-implemented method of example 1, further comprising generating, by the content delivery service, a third per pixel salience score map for one or more textual regions of the first frame, wherein the combining comprises combining, by the content delivery service, the first per pixel salience score map for the one or more objects in the first frame, the second per pixel salience score map for the one or more edges of the first frame, and the third per pixel salience score map for the one or more textual regions of the first frame into the single per pixel salience score map for the first frame.

Example 4. A computer-implemented method comprising:
  receiving a frame of a video at a content delivery service;
  generating, by a machine learning model of the content delivery service, a per pixel salience score map for the frame; and
  inserting, by the content delivery service, secondary content into the frame based at least in part on the per pixel salience score map for the frame.

Example 5. The computer-implemented method of example 4, further comprising, before the generating the per pixel salience score map for the frame:
  generating, by the content delivery service, a first per pixel salience score map for one or more objects in a second frame of a second video;
  generating, by the content delivery service, a second per pixel salience score map for one or more edges of the second frame;
  combining, by the content delivery service, the first per pixel salience score map for the one or more objects in the second frame and the second per pixel salience score map for the one or more edges of the second frame into a single per pixel salience score map for the second frame; and
  training the machine learning model based at least in part on the single per pixel salience score map for the second frame.

Example 6. The computer-implemented method of example 5, wherein the generating, by the content delivery service, the first per pixel salience score map for the one or more objects in the second frame comprises:
  generating, by the content delivery service, a face score map for one or more human faces in the second frame.

Example 7. The computer-implemented method of example 6, wherein the generating, by the content delivery service, the first per pixel salience score map for the one or more objects in the second frame further comprises:
  generating, by the content delivery service, a body score map for one or more human bodies in the second frame.

Example 8. The computer-implemented method of example 7, further comprising generating, by the content delivery service, a third per pixel salience score map for one or more textual regions of the second frame, wherein the combining comprises combining, by the content delivery service, the face score map for the one or more human faces in the second frame, the body score map for the one or more human bodies in the second frame, the second per pixel salience score map for the one or more edges of the second frame, and the third per pixel salience score map for the one or more textual regions of the second frame into the single per pixel salience score map for the second frame.

Example 9. The computer-implemented method of example 5, wherein the generating, by the content delivery service, the first per pixel salience score map for the one or more objects in the second frame comprises:
  generating, by the content delivery service, a body score map for one or more human bodies in the second frame.

Example 10. The computer-implemented method of example 5, further comprising generating, by the content delivery service, a third per pixel salience score map for one or more textual regions of the second frame, wherein the combining comprises combining, by the content delivery service, the first per pixel salience score map for the one or more objects in the second frame, the second per pixel salience score map for the one or more edges of the second frame, and the third per pixel salience score map for the one or more textual regions of the second frame into the single per pixel salience score map for the second frame.

Example 11. The computer-implemented method of example 4, wherein the secondary content is a logo, and the inserting comprises:
  determining, by the content delivery service, dimensions of the logo;
  determining, from the per pixel salience score map for the frame based on the dimensions of the logo, a cumulative saliency score for a plurality of candidate regions of the frame; and
  selecting a region, from the plurality of candidate regions, having a lowest cumulative saliency score for insertion of the logo into the frame.

Example 12. The computer-implemented method of example 4, wherein the secondary content is a subtitle of corresponding audio of the video, and the inserting comprises: determining, by the content delivery service, dimensions of the subtitle;
  determining, from the per pixel salience score map for the frame based on the dimensions of the subtitle, a cumulative saliency score for a plurality of candidate regions of the frame; and
  selecting a region, from the plurality of candidate regions, having a lowest cumulative saliency score for insertion of the subtitle into the frame.

Example 13. The computer-implemented method of example 4, further comprising generating, by the content delivery service, an image having dimensions that are less than dimensions of the frame based at least in part on the per pixel salience score map for the frame.

Example 14. The computer-implemented method of example 13, wherein the generating the image comprises:
  determining, from the per pixel salience score map for the frame based on the dimensions of the image, a cumulative saliency score for a plurality of candidate regions of the frame; and
  selecting a region, from the plurality of candidate regions, having a highest cumulative saliency score as the image.

Example 15. A non-transitory computer-readable medium storing code that, when executed by a device, causes the device to perform a method comprising:
  receiving a frame of a video;
  generating, by a machine learning model, a per pixel salience score map for the frame; and
  inserting secondary content into the frame based at least in part on the per pixel salience score map for the frame.

Example 16. The non-transitory computer-readable medium of example 15, wherein the method further comprises, before the generating the per pixel salience score map for the frame:
  generating a first per pixel salience score map for one or more objects in a second frame of a second video;
  generating a second per pixel salience score map for one or more edges of the second frame;
  combining the first per pixel salience score map for the one or more objects in the second frame and the second per pixel salience score map for the one or more edges of the second frame into a single per pixel salience score map for the second frame; and
  training the machine learning model based at least in part on the single per pixel salience score map for the second frame.

Example 17. The non-transitory computer-readable medium of example 16, wherein the generating the first per pixel salience score map for the one or more objects in the second frame comprises generating a face score map for one or more human faces in the second frame.

Example 18. The non-transitory computer-readable medium of example 16, wherein the generating the first per pixel salience score map for the one or more objects in the second frame comprises generating a body score map for one or more human bodies in the second frame.

Example 19. The non-transitory computer-readable medium of example 16, wherein the method further comprises generating a third per pixel salience score map for one or more textual regions of the second frame, and the combining comprises combining the first per pixel salience score map for the one or more objects in the second frame, the second per pixel salience score map for the one or more edges of the second frame, and the third per pixel salience score map for the one or more textual regions of the second frame into the single per pixel salience score map for the second frame.

Example 20. The non-transitory computer-readable medium of example 15, wherein the method further comprises generating an image having dimensions that are less than dimensions of the frame based at least in part on the per pixel salience score map for the frame.

Figure 7:
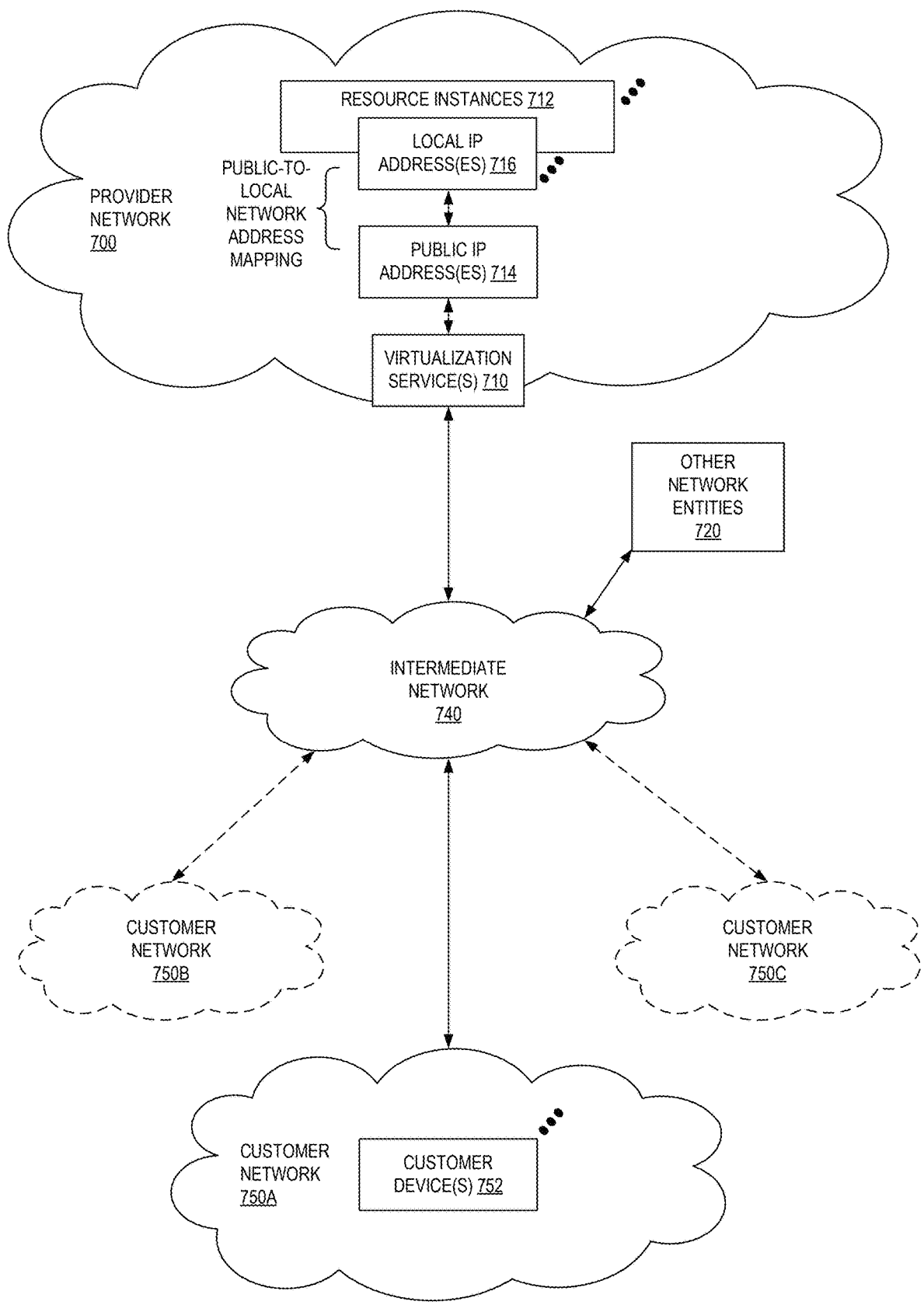
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
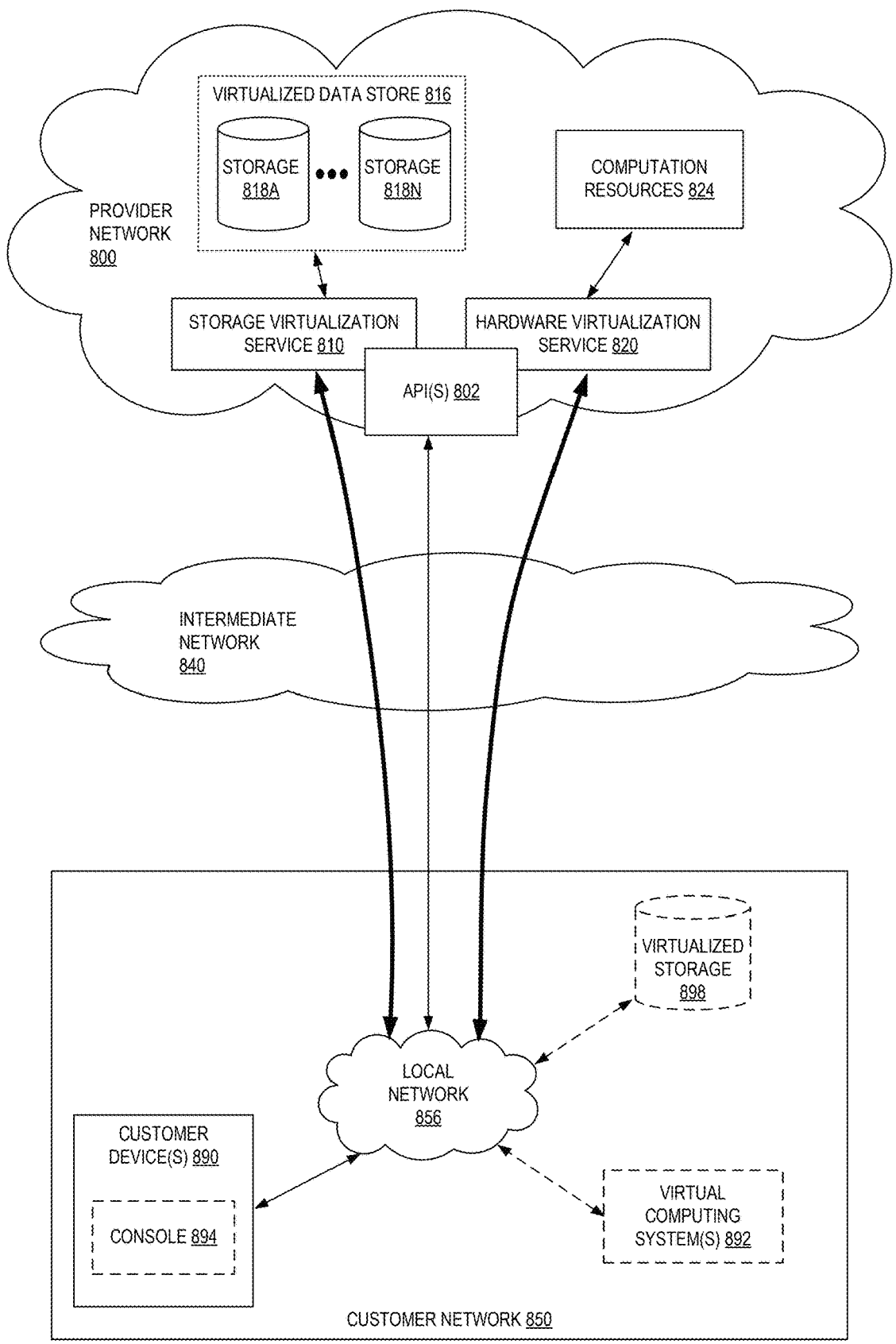
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
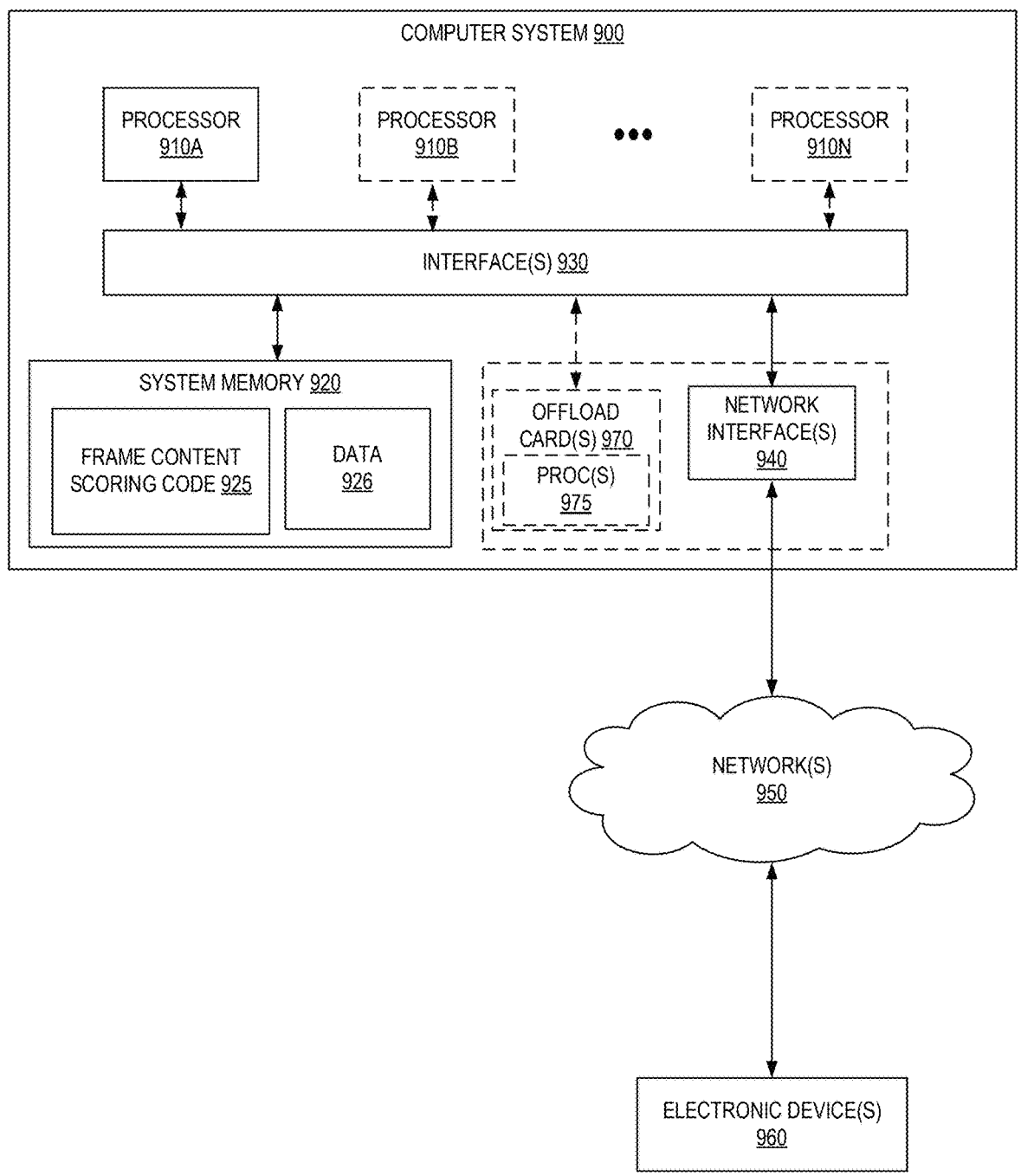
FIG. 9 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as frame content scoring code 925 (e.g., executable to implement, in whole or in part, the operations discussed herein) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Figure 10:
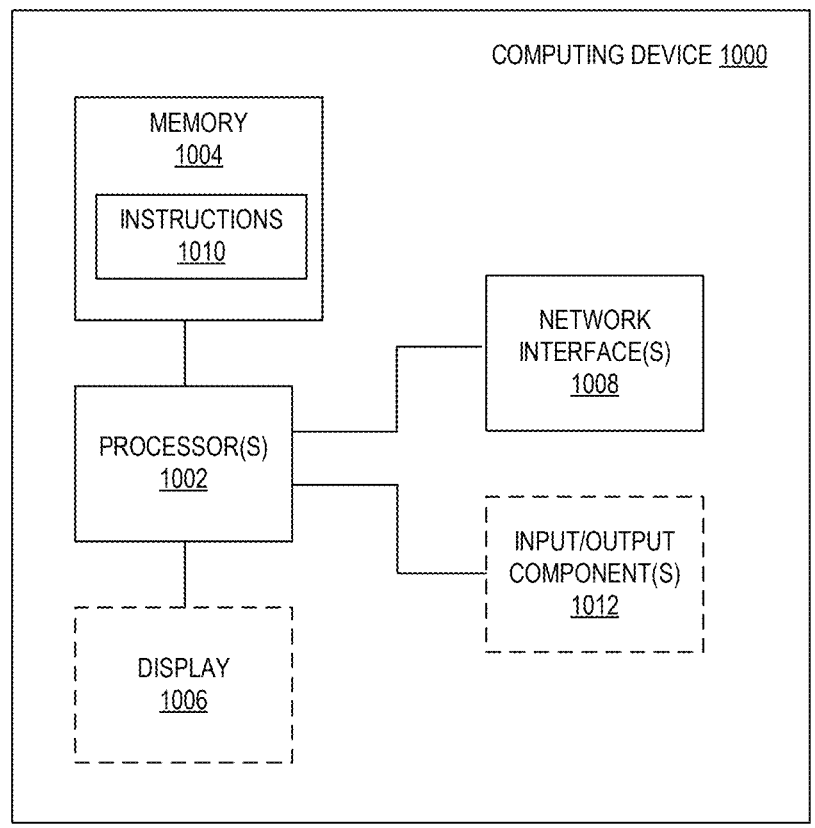
FIG. 10 illustrates a logical arrangement of a set of general components of an exemplary computing device that can be utilized in accordance with various embodiments.

FIG. 10 illustrates a logical arrangement of a set of general components of an example computing device 1000. Generally, a computing device 1000 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1002 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1004) to store code (for example, instructions 1010, e.g., which implement a content delivery service as disclosed herein), and a set of one or more wired or wireless network interfaces 1008 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1004) of a given electronic device typically stores code (e.g., instructions 1010) for execution on the set of one or more processors 1002 of that electronic device. One or more parts of various embodiments may be implemented using different combinations of software, firmware, and/or hardware.

A computing device 1000 can include some type of display element 1006, such as a touch screen or liquid crystal display (LCD), although many devices such as portable media players might convey information via other means, such as through audio speakers, and other types of devices such as server end stations may not have a display element 1006 at all. As discussed, some computing devices used in some embodiments include at least one input and/or output component(s) 1012 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 11:
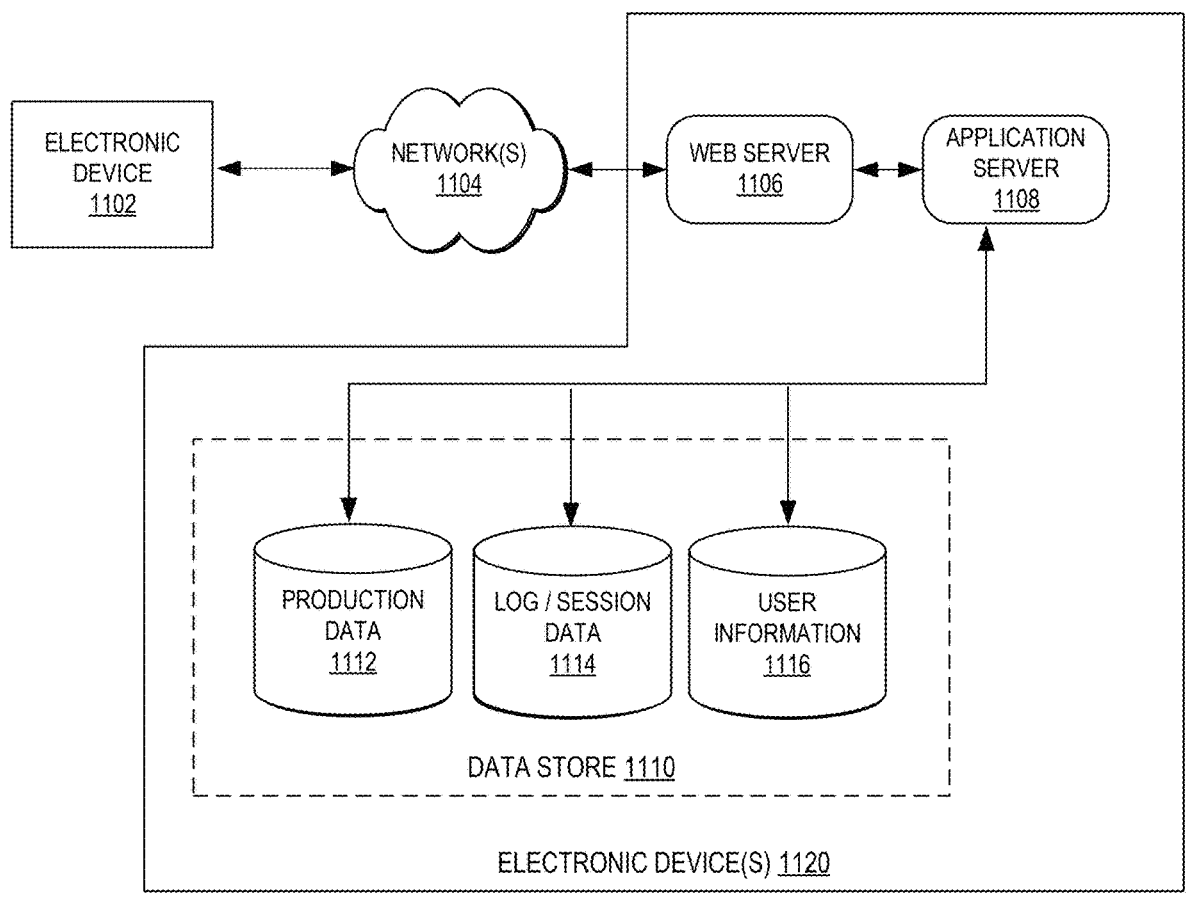
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. For example, in some embodiments messages are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various embodiments. The system includes an electronic client device 1102, which may also be referred to as a client device and can be any appropriate device operable to send and receive requests, messages, or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a first frame of a first video at a content delivery service;
   generating, by the content delivery service, a first per pixel salience score map for one or more objects in the first frame;
   generating, by the content delivery service, a second per pixel salience score map for one or more edges of the first frame;
   combining, by the content delivery service, the first per pixel salience score map for the one or more objects in the first frame and the second per pixel salience score map for the one or more edges of the first frame into a single per pixel salience score map for the first frame based on a first perceptual weight for the first per pixel salience score map for the one or more objects in the first frame and a second perceptual weight for the second per pixel salience score map for the one or more edges of the first frame;
   training a machine learning model to generate the single per pixel salience score map for the first frame using the first perceptual weight for the first per pixel salience score map and the second perceptual weight for the second per pixel salience score map in a loss function of the machine learning model;
   receiving a second frame of a second video at the content delivery service;
   generating, by the trained machine learning model, a second single per pixel salience score map for the second frame; and
   inserting, by the content delivery service, secondary content into the second frame based at least in part on the second single per pixel salience score map for the second frame.

2. The computer-implemented method of claim 1, wherein the generating, by the content delivery service, the first per pixel salience score map for the one or more objects in the first frame comprises at least one of:
   generating, by the content delivery service, a face score map for one or more human faces in the first frame; or
   generating, by the content delivery service, a body score map for one or more human bodies in the first frame.

3. The computer-implemented method of claim 1, further comprising generating, by the content delivery service, a third per pixel salience score map for one or more textual regions of the first frame, wherein the combining comprises combining, by the content delivery service, the first per pixel salience score map for the one or more objects in the first frame, the second per pixel salience score map for the one or more edges of the first frame, and the third per pixel salience score map for the one or more textual regions of the first frame into the single per pixel salience score map for the first frame based on the first perceptual weight for the first per pixel salience score map for the one or more objects in the first frame, the second perceptual weight for the second per pixel salience score map for the one or more edges of the first frame, and a third perceptual weight for the third per pixel salience score map for the one or more textual regions of the first frame.

4. A computer-implemented method comprising:
   generating, by a content delivery service, a first per pixel salience score map for a first frame of a first video;
   generating, by the content delivery service, a second per pixel salience score map for one or more edges of the first frame;
   combining, by the content delivery service, the first per pixel salience score map for the first frame and the second per pixel salience score map for the one or more edges of the first frame into a single per pixel salience score map for the first frame based on a first weight for the first per pixel salience score map and a second weight for the second per pixel salience score map;

training a machine learning model to generate the single per pixel salience score map for the first frame using the first weight for the first per pixel salience score map and the second weight for the second per pixel salience score map in a loss function of the machine learning model;

receiving a second frame of a second video at the content delivery service;

generating, by the trained machine learning model of the content delivery service, a second single per pixel salience score map for the second frame; and inserting, by the content delivery service, secondary content into the second frame based at least in part on the second single per pixel salience score map for the second frame.

5. The computer-implemented method of claim 4, wherein the first per pixel salience score map is an object score map for one or more objects in the first frame.

6. The computer-implemented method of claim 5, wherein the generating, by the content delivery service, the first per pixel salience score map for the one or more objects in the first frame comprises:

generating, by the content delivery service, a face score map for one or more human faces in the first frame.

7. The computer-implemented method of claim 6, wherein the generating, by the content delivery service, the first per pixel salience score map for the one or more objects in the first frame further comprises:

generating, by the content delivery service, a body score map for one or more human bodies in the first frame.

8. The computer-implemented method of claim 7, further comprising generating, by the content delivery service, a third per pixel salience score map for one or more textual regions of the first frame, wherein the combining comprises combining, by the content delivery service, the face score map for the one or more human faces in the first frame, the body score map for the one or more human bodies in the first frame, the second per pixel salience score map for the one or more edges of the first frame, and the third per pixel salience score map for the one or more textual regions of the first frame into the single per pixel salience score map for the first frame based on the first weight for the first per pixel salience score map, the second weight for the second per pixel salience score map, and a third weight for the third per pixel salience score map, wherein the first weight comprises a weight for the face score map and a weight for the body score map.

9. The computer-implemented method of claim 5, wherein the generating, by the content delivery service, the first per pixel salience score map for the one or more objects in the first frame comprises:

generating, by the content delivery service, a body score map for one or more human bodies in the first frame.

10. The computer-implemented method of claim 5, further comprising generating, by the content delivery service, a third per pixel salience score map for one or more textual regions of the first frame, wherein the combining comprises combining, by the content delivery service, the first per pixel salience score map for the one or more objects in the first frame, the second per pixel salience score map for the one or more edges of the first frame, and the third per pixel salience score map for the one or more textual regions of the first frame into the single per pixel salience score map for the first frame based on the first weight for the first per pixel salience score map, the second weight for the second per pixel salience score map, and a third weight for the third per pixel salience score map.

11. The computer-implemented method of claim 10, wherein the training further comprises training the machine learning model to generate the single per pixel salience score map for the first frame using the third weight for the third per pixel salience score map in the loss function of the machine learning model.

12. The computer-implemented method of claim 4, wherein the secondary content is a subtitle of corresponding audio of the second video, and the inserting comprises:

determining, by the content delivery service, dimensions of the subtitle;

determining, from the second single per pixel salience score map for the second frame based on the dimensions of the subtitle, a cumulative saliency score for a plurality of candidate regions of the second frame; and selecting a region, from the plurality of candidate regions, having a lowest cumulative saliency score for insertion of the subtitle into the second frame.

13. The computer-implemented method of claim 4, further comprising generating, by the content delivery service, an image from the second frame having dimensions that are less than dimensions of the second frame based at least in part on the second single per pixel salience score map for the second frame.

14. The computer-implemented method of claim 13, wherein the generating the image comprises:

determining, from the second single per pixel salience score map for the second frame based on the dimensions of the image, a cumulative saliency score for a plurality of candidate regions of the second frame; and selecting a region, from the plurality of candidate regions, having a highest cumulative saliency score as the image.

15. A non-transitory computer-readable medium storing code that, when executed by a device, causes the device to perform a method comprising:

generating a first per pixel salience score map for a first frame of a first video;

generating a second per pixel salience score map for one or more edges of the first frame;

combining the first per pixel salience score map for the first frame and the second per pixel salience score map for the one or more edges of the first frame into a single per pixel salience score map for the first frame based on a first weight for the first per pixel salience score map and a second weight for the second per pixel salience score map;

training a machine learning model to generate the single per pixel salience score map for the first frame using the first weight for the first per pixel salience score map and the second weight for the second per pixel salience score map in a loss function of the machine learning model;

receiving a second frame of a second video;

generating, by the trained machine learning model, a second single per pixel salience score map for the second frame; and inserting secondary content into the second frame based at least in part on the second single per pixel salience score map for the second frame.

16. The non-transitory computer-readable medium of claim 15, wherein the first per pixel salience score map is an object score map for one or more objects in the first frame.

17. The non-transitory computer-readable medium of claim 16, wherein the generating the first per pixel salience score map for the one or more objects in the first frame comprises generating a face score map for one or more human faces in the first frame.

18. The non-transitory computer-readable medium of claim 16, wherein the generating the first per pixel salience score map for the one or more objects in the first frame comprises generating a body score map for one or more human bodies in the first frame.

19. The non-transitory computer-readable medium of claim 16, wherein the method further comprises generating a third per pixel salience score map for one or more textual regions of the first frame, and the combining comprises combining the first per pixel salience score map for the one or more objects in the first frame, the second per pixel salience score map for the one or more edges of the first frame, and the third per pixel salience score map for the one or more textual regions of the first frame into the single per pixel salience score map for the first frame based on the first weight for the first per pixel salience score map, the second weight for the second per pixel salience score map, and a third weight for the third per pixel salience score map.

20. The non-transitory computer-readable medium of claim 15, wherein the method further comprises generating an image having dimensions that are less than dimensions of the second frame based at least in part on the second single per pixel salience score map for the second frame.

* * * * *